United States Patent Office 3,830,914
Patented Aug. 20, 1974

3,830,914
MICRO-ENCAPSULATED INSECTICIDE FEED-ADDITIVE FOR CONTROL OF FLY LARVAE IN COW MANURE
Richard W. Miller, Bowie, and Morton Beroza, Silver Spring, Md., assignors to the United States of America as represented by the Secretary of Agriculture
No Drawing. Continuation-in-part of abandoned application, Ser. No. 60,938, Aug. 4, 1970. This application June 28, 1971, Ser. No. 157,762
Int. Cl. A01n 9/36
U.S. Cl. 424—219    5 Claims

ABSTRACT OF THE DISCLOSURE

A micro-encapsulated insecticide fed to lactating dairy cows gives effective control of the development of insecticide resistant and nonresistant fly larvae in manure.

---

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of our copending application for patent, Ser. No. 60,938, filed Aug. 4, 1970, and now abandoned.

This invention relates to the use of micro-encapsulated insecticide that is fed to animals to cause the feces of these animals to be larvicidal. Since feces are prime breeding sites of many harmful insects, effective control of the feces-breeding larvae is obtained. Flies are common pests of dairy and other cattle in all parts of the United States and throughout most of the world. They cause very serious losses in milk and meat production and can act as vectors of disease by carrying or transmitting disease and filth organisms. Many of the offending insects lay their eggs in cow manure and the emerging larvae develop therein; e.g., the face fly, *Musca autumnalis* De Geer; the stable fly, *Stomoxys calcitrans* (L.); the horn fly, *Haematobia irritans* (L.); and the house fly, *Musca domestica* L. If manure can be eliminated as a breeding site, the life cycle of the flies could be interrupted and their populations controlled. Thus, the need to spray insecticides for the control of adult flies, which is expensive, time-consuming to apply, and effective for only a short time, could be reduced significantly. If the amount of insecticide needed to control insects could be reduced, it would be of considerable importance in our efforts to reduce pollution and the appearance of residues of toxic chemicals in our food sources.

Many insecticides have been tested as feed-additive larvicides, and though some have proved to be effective experimentally, no feed-additive larvicide effective against the house fly is currently available to the farmer.

The insecticides that have been tested a feed-additive larvicides in our laboratory against nonresistant house fly larvae are shown in Table I.

The last insecticide listed in Table I [2-chloro-1-(2,4,5-trichlorophenyl vinyl dimethyl phosphate] [75% wettable powder (WP)] was effective against non-insecticide-resistant larvae at 36 p.p.m. of the ration although only 0.3% of the insecticide fed reached the feces. Control of insecticide-resistant larvae could be obtained if a larger portion of the insecticide were to appear in the feces and not be metabolized in the digestive tract of the animal.

It is therefore, an object of this invention to provide a means of increasing the amount of an insecticide appearing in the feces of cattle fed said insecticide to obtain more effective control of feces-breeding dipterous insects.

Another object of this invention is to minimize the amount of feed-additive larvicide absorbed by cattle consuming said larvicide and thereby protect the health of the animal.

Another object of this invention is to achieve control of resistant dipterous insects which cannot be reasonably controlled by feeding larvicides unencapsulated.

Yet another object of this invention is to decrease the amount of insecticide fed to animals for control of feces-breeding dipterous insects and thereby decrease the possibility of residues appearing in the milk or meat of the cattle consuming said insecticide.

A further object of this invention is to provide a less expensive, more efficient, and more effective means of controlling feces-breeding dipterous insects than the insecticide spraying procedures now in use.

A still further object of this invention is to provide a feed-additive larvicide that will be readily accepted by cattle.

Still another object of this invention is to decrease or eliminate the hazard of feeding insecticide to cattle for the control of feces-breeding dipterous insects.

According to this invention the insecticide is fed to cattle in micro-capsules (5–60 microns) that are dispersed in all or part of the normal feed of the animal. The encapsulated insecticide passes through the alimentary tract of the animal and because release of the insecticide is delayed, a higher proportion of the insecticide is available in the feces for larvicidal action than the proportion available from the unencapsulated insecticide. The end result is more effective and more efficient control of feces-breeding larvae. At the same time the animal is exposed to less insecticide than would otherwise be necessary to achieve a given degree of control. The exposure of the animal to less insecticide results in decreased possibility of residues in the meat and milk of the animal, decreased hazard in using the insecticide, and better health of the treated animals. In addition, since it is known that the cholinesterase activity of the blood is depressed by organophosphorus insecticides, it is desirable to protect the animal from excess exposure to this type of insecticide.

Probabaly the major difficulty in controlling feces-breeding dipterous insects by feed-additive larvicides is the appearance of insects resistant to these larvicides. Thus, good control obtained in early work with these larvicides is not being obtained today with many of the resistant strains of insects currently plaguing cattle. The hazards of increasing the dose of larvicide are apparent and doubtless will not be sanctioned by government authorities. A satisfactory alternative is the use of the encapsulated insecticides of this invention, which have been shown to be effective on insecticide-resistant and insecticide nonresistant insects.

Examples of the use of the encapsulated insecticides follow. The insecticide used in these trials was 2-chloro-1-(2,4,5-trichlorophenyl) vinyl dimethyl phosphate. The insecticide was encapsulated by a commercially available method (U.S. Pats. 3,242,051 and 3,265,629) to give several formulations containing from 41–59% active insecticide. The encapsulated formulations were fed to cows and the feces were bioassayed to determine which formulation was best. The microencapsulation selected was designed so that the capsules would pass through the rumen and not release the insecticide until it reached a point farther down the digestive tract. Feed containing the microencapsulated insecticide was readily accepted by the test animals.

House fly larvae were used in our experiments; however, other dipterous larvae should also be controlled at levels needed for larval house fly control as the literature states that the house fly is one of the most difficut faces-breeding dipterous larvae to control with insecticides (J. Econ. Entomol. 54, 406-8 (1961) and 57, 881-4, 1964 for face fly; J. Econ. Entomol. 56, 344-7 (1963) and 54, 408-11 (1961) for horn fly and for stable fly).

EXAMPLE 1

Dairy cows were fed several levels of 2-chloro-1-(2,4,5-trichlorophenyl vinyl dimethyl phosphate [expressed as parts per million (p.p.m.) of their ration] in encapsulated (45–50% active insecticide) and unencapsulated (75% WP) form, and insecticide resistant and nonresistant house fly larvae were seeded onto the feces of the cows. The ration used in this and the following examples consisted of either a complete feed (60% concentrate, 20% course ground alfalfa hay, and 20% alfalfa pellets) or a ration composed of concentrates, silage and alfalfa pellets. When the complete feed was used the insecticide was mixed with the entire ration. When the alternate ration was used the insecticide was mixed with 200 grams of concentrate which in turn was mixed into the total concentrate allowance which was fed twice a day. Either scheme was an acceptable method to feed the insecticide. With the nonresistant larvae, feces from cows consuming 22-48 p.p.m. of non-encapsulated insecticide in their diet gave 94% control while 100% control was obtained from feces of cows consuming only 6–9 p.p.m. of encapsulated insecticide. With highly insecticide-resistant house fly larvae, the feeding of encapsulated insecticide at the 9 p.p.m. level caused a 75% kill, while the feeding of unencapsulated insecticide at the same level caused only a 7% kill.

EXAMPLE 2

A balance trial was conducted with the encapsulated insecticide formulation used in Example 1. Fifteen percent of the insecticide fed appeared in the feces. Balance trials with unencapsulated insecticide showed that only 0.3% of the insecticide fed appeared in the feces.

EXAMPLE 3

In another trial, the feces from cows fed 15 and 30 p.p.m. encapsulated 2 - chloro-1-(2,4,5-trichlorophenyl) vinyl dimethyl phosphate (59% active insecticide) killed 92 and 100% of the resistant house fly larvae seeded onto the feces compared to kills of 28 and 64% obtained with the unencapsulated (75% WP) insecticide.

EXAMPLE 4

The efficacy of the encapsulated insecticide was also demonstrated under field conditions. During one summer about 50 lactating dairy cows were fed unencapsulated 2-chloro-1-(2,4,5-trichlorophenyl) vinyl dimethyl phosphate (75% WP) at an average level of 87 p.p.m. Manure from these cows was placed in a windrow, and the emergence of fly larvae from this manure was compared with that from the manure of cows fed no insecticide. No control was obtained. In another summer, ten lactating dairy cows were fed the encapsulated insecticide (57% active insecticide) at a level of 66 p.p.m. When the emergence of fly larvae from their manure was compared with that from their manure was compared with that from 10 untreated cows, 94% control of house fly larvae was obtained.

The foregoing examples are meant to be illustrative rather than limiting. It is understood that different insecticides or encapsulating materials may be used, and as is known in the art level of insecticide used will depend on the animal concerned and the insects being controlled. Dairy cows were used in these experiments; however, it is obvious to one skilled in the art that this invention is not limited to dairy cows but would include at least all ruminants and probably other animals as well. The size of the micro-capsules may also be varied limits without departure from the disclosures of this invention. An organophosphorus insecticide was used because insecticides in this class are biodegradable and, therefore, will not persist in the environment.

TABLE I

| Insecticide | Maximum level fed or level necessary for 100% control, p.p.m. of ration | Larval Mortality, percent |
|---|---|---|
| O,O-dimethyl O-2,4,5-trichlorophenyl phosphorothioate | 120 | 57 |
| O,O-dimethyl S-(N-methylcarbamoylmethyl) phosphorodithioate | 24 | 7 |
| O,O-dimethyl O-[4-(methylthio)-m-tolyl] phosphorothioate | 144 | *100 |
| O-(3-chloro-4-methyl-2-oxo-2H-1-benzopyran-7-yl) O,O-diethyl phosphorothioate | 150 | 93 |
| O-(2,5-dichloro-4-iodophenyl) O,O-dimethylphosphorothioate | 72 | 26 |
| O,O-diethyl O-(2-isopropyl-4-methyl-6-pyrimidyl) phosphorothioate | 108 | 55 |
| Dimethyl (2,2,2-trichloro-1-hydroxyethyl) phosphonate | 48 | 0 |
| O-(4-bromo-2,5-dichlorophenyl) O,O-dimethyl phosphorothioate | 252 | 80 |
| 2-chloro-1-(2,4,5-trichlorophenyl) vinyl dimethyl phosphate | 36 | 100 |

*Using resistant flies the larval kill was 36%.

We claim:

1. A method of killing the larvae of dipterous insects that breed in the feces of cattle, comprising microencapsulating an insecticide, 2-chloro-1-(2,4,5-trichlorophenyl) vinyl dimethyl phosphate, with a coating effective to delay release of the insecticide until after it has passed through the alimentary tract of said cattle, incorporating in the standard ration if said cattle an amount of the microencapsulated insecticide effective to kill feces breeding larvae, feeding said standard ration to the cattle and allowing the micriencapsulates insecticine to pass through the alimentary tract of said cattle thereby making available in the feces an amount of the insecticide effective to kill feces breeding larvae.

2. The method of claim 1 wherein the larvae are non-insecticide-resistant.

3. The method of claim 2 wherein 6 to 9 parts per million of the insecticide are added to the standard ration of said cattle.

4. The method of claim 1 wherein the larvae are insecticide-resistant.

5. The method of claim 4 wherein 15 to 30 parts per million if the insecticide are added to the standard ration of said cattle.

References Cited

UNITED STATES PATENTS 3,398,225  8/1968  Bellin _____ 424—34
3,102,842  9/1963  Phillips et al. _____ 424—219

VINCENE D. TURNER, Primary Examiner

U.S. Cl. X.R.

424—31.